United States Patent
Lan et al.

(10) Patent No.: US 12,290,035 B2
(45) Date of Patent: May 6, 2025

(54) PLANT LIGHTING SYSTEM

(71) Applicant: Shenzhen Guanke Technologies Co., Ltd, Shenzhen (CN)

(72) Inventors: Qing Lan, Shenzhen (CN); Ligen Liu, Shenzhen (CN); Rong Xie, Shenzhen (CN); Qinwan Gong, Shenzhen (CN)

(73) Assignee: SHENZHEN GUANKE TECHNOLOGIES CO., LTD, Shenzhen (CN)

( * ) Notice: Subject to any disclaimer, the term of this patent is extended or adjusted under 35 U.S.C. 154(b) by 247 days.

(21) Appl. No.: 18/317,308

(22) Filed: May 15, 2023

(65) Prior Publication Data

US 2024/0008418 A1 Jan. 11, 2024

Related U.S. Application Data

(63) Continuation-in-part of application No. 17/940,336, filed on Sep. 8, 2022, now Pat. No. 12,052,957.

(30) Foreign Application Priority Data

Jul. 11, 2022 (CN) .......................... 202221876864.6

(51) Int. Cl.
*A01G 31/06* (2006.01)
*A01G 7/04* (2006.01)
*A01G 9/24* (2006.01)

(52) U.S. Cl.
CPC ............. *A01G 7/045* (2013.01); *A01G 9/249* (2019.05); *A01G 31/06* (2013.01)

(58) Field of Classification Search
CPC .................................. A01G 9/249; A01G 31/06
See application file for complete search history.

(56) References Cited

U.S. PATENT DOCUMENTS

| | | | |
|---|---|---|---|
| 11,297,779 B1* | 4/2022 | Lund | A01G 9/246 |
| 11,598,516 B1* | 3/2023 | Yang | F21V 23/003 |
| 2013/0255146 A1* | 10/2013 | Lehman | A01G 31/02 47/17 |
| 2016/0324090 A1* | 11/2016 | Miyabe | A01G 31/06 |
| 2017/0354099 A1* | 12/2017 | Haughton | A01G 9/249 |
| 2019/0059241 A1* | 2/2019 | Bogner | A01G 9/249 |
| 2020/0000043 A1* | 1/2020 | Bennett | A01G 7/045 |
| 2021/0059140 A1* | 3/2021 | McHenry, III | A01G 9/027 |
| 2021/0274721 A1* | 9/2021 | Tsao | F21V 21/24 |

* cited by examiner

*Primary Examiner* — Monica L Perry
(74) *Attorney, Agent, or Firm* — Maier & Maier, PLLC (57) ABSTRACT

A plant lighting system, including at least one growth rack, lifting mechanism and plant lamp. The growth rack includes at least one rack layer in an up-and-down direction, and each of the rack layers has a tray; each of the rack layers is provided with the lifting mechanism, and each two of the lifting mechanisms are oppositely arranged on two sides of one of the trays; the lifting mechanism includes at least one driving member, at least one telescopic member and at least one supporting structure, the telescopic member extends in an up-and-down direction, the supporting structure is provided at an upper end of the telescopic member and is substantially perpendicular to the telescopic member, and the driving member can drive the telescopic member to telescope up-and-down; opposite ends of the plant lamp ride over the supporting structures, and the light of the plant lamp shines toward the tray.

10 Claims, 7 Drawing Sheets

PLANT LIGHTING SYSTEM

TECHNICAL FIELD

The present disclosure relates to the technical field of lamps, and in particular to a plant lighting system.

BACKGROUND

The indoor artificial cultivation generally uses at least one plant lighting system composed of at least one plant lamp and at least one three-dimensional growth rack to improve the illumination intensity and the indoor space utilization efficiency. In the related art plant lighting system, the lifting and lowering of the plant lamp in the plant lighting system is generally achieved by using an electric motor and at least one lifting rope mechanism, namely, the lifting and lowering of the plant lamp connected to the lifting rope is achieved by driving the lifting rope to be released and tightened by the positive and negative rotation of the electric motor. However, in this case, if the growth rack for mounting the plant lamp is not provided with corresponding guide grooves at the four corners of the corresponding plant lamp, the lifting process of the plant lamp is liable to shake, affecting the stability of the electrical connection of the lamp tube and leading to the failure of the lamp tube. However, when the growth rack is provided with corresponding guide grooves for the plant lamps, since a plurality of plant lamps are successively arranged in the up-and-down direction, corresponding four guide grooves on the growth rack are also arranged to be relatively long, which makes it extremely inconvenient to replace the plant lamps.

SUMMARY

The main object of the present present disclosure is to provide a plant lighting system aiming at improving the stability of a plant lamp during lifting and lowering, and at the same time improving the convenience of replacing the plant lamp.

In order to achieve the above-mentioned object, the plant lighting system proposed by the present present disclosure comprises:
  at least one growth rack, wherein the growth rack comprises at least one rack layer in an up-and-down direction, and each of the rack layers is provided with at least one tray;
  at least one lifting mechanism, wherein the lifting mechanism is provided in each of the rack layers, and each two of the lifting mechanisms are oppositely arranged at two sides of one of the trays; the lifting mechanism comprises at least one driving member, at least one telescopic member and at least one supporting structure, wherein the telescopic member extends in an up-and-down direction, the supporting structure is provided at the upper end of the telescopic member and is arranged substantially perpendicular to the telescopic member, and the driving member can drive the telescopic member to telescope in the up-and-down direction; and
  at least one plant lamp, opposite ends of the plant lamp being movably arranged above two of the supporting structures, and the light of the plant lamp being illuminated towards the tray.

Other features and corresponding advantages of the present application are set forth in a later portion of the specification.

The technical problem solving idea and the relevant product design scheme of the present application are: the lifting mechanism in the plant lighting system is provided to comprise at least one driving member, at least one telescopic member and at least one supporting structure, wherein the supporting structure can support and accommodate, and the driving member provides power to drive the supporting structure and the plant lamp to lift during the process of driving the telescopic member to telescope. Furthermore, since the telescopic member can only be telescoped in the up-and-down direction, the possibility of the plant lamp shaking during lifting is reduced so as to improve the stability of the plant lamp during lifting. At the same time, the two ends of the plant lamp are movably arranged above the supporting structure, so that the plant lamp and the supporting structure have no fixed connection relationship, thereby enabling the plant lamp to be quickly placed and removed on the supporting structure, namely, improving the convenience of replacing the plant lamp.

The shape, size, proportion or positional relationship of the component parts of the product shown in the drawings can be actual data of the embodiments and fall within the scope of protection of the present application.

DETAILED DESCRIPTION

In order that the objects, aspects and advantages of the present application will become more apparent, a more particular description of embodiments of the present application will be rendered by reference to the appended drawings. It should be understood that the particular embodiments described herein are illustrative only and are not restrictive.

With reference to FIG. 1 to 4, the present present disclosure proposes a plant lighting system 100, comprising at least one growth rack 10, at least one lifting mechanism 20 and at least one plant lamp 30. The growth rack 10 comprises at least one rack layer 11 in an up-and-down direction, and each rack layer 11 is provided with at least one tray 111; each rack layer 11 is provided with at least one lifting mechanism 20 therein, and each two lifting mechanisms 20 are oppositely arranged on two sides of one tray 111; the lifting mechanism 20 comprises at least one driving member 21, at least one telescopic member 23 and at least one supporting structure 25, wherein the telescopic member 23 extends in an up-and-down direction, and the supporting structure 25 is provided at the upper end of the telescopic member 23 and is substantially vertically arranged with the telescopic member 23 (including the case of being completely vertical, and also including the case of having a relatively small inclination angle, such as an inclination angle of 1°, 2° and 3°), and the driving member 21 can drive the telescopic member 23 to telescope in the up-and-down direction; the opposite ends of the plant lamps 30 are movably arranged above the two supporting structures 25, and the light of the plant lamps 30 is irradiated toward the tray 111.

The above-described plant lighting system 100 is also a device for providing light to plants for the purpose of artificial indoor cultivation of the plants. The growth rack 10 may serve as the main body structure of the plant lighting system 100 to mount and carry the lifting mechanism 20, the plant lamps 30, and plants to be cultivated. Among other things, the growth rack 10 may have a square configuration to provide a more regular shape for ease of manufacturing. Meanwhile, it is also configured such that when the plant lighting system 100 includes at least two growth racks 10, splicing and arrangement between the at least two growth racks 10 can be facilitated to improve the utilization efficiency of the indoor space. However, the specific structure of the growth rack 10 can be formed by a plurality of columns, or a plurality of plates, or a combination of a plurality of columns and a plurality of plates, and the specific structure of the growth rack 10 is not limited in the present application, and can be used for mounting the lifting mechanism 20, the plant lamp 30 and the plant to be cultivated, etc. The tray 111 on each rack layer 11 may be surrounded by a bottom plate and a surrounding plate arranged around the periphery of the bottom plate to form a structure for placing plants to be cultivated. The plant lamp 30 may be used to provide light to plants placed on the tray 111 so that the plants grow normally and stably. The plant lamp 30 can be a LED lamp, and of course, an incandescent lamp, and the present application does not define the specific type of the plant lamp 30. In order to achieve that the height position of the plant lamp 30 can be adjusted to adapt to the use of plants having different heights, or to adapt to the use of plants having heights at different incubation periods, at least one lifting mechanism for driving the plant lamp 30 to lift is provided. Among other things, the driving member 21 in the lifting mechanism 20 can be used to provide power to drive the telescopic member 23 to telescope. The telescopic member 23 can have a guiding function by being telescopic only in its extending direction, so that the supporting structure 25 can be moved only in the up-and-down direction, so that the supporting structure 25 and the plant lamp 30 arranged on the supporting structure 25 can be stably lifted and lowered. The supporting structure 25 may be used to provide at least one mounting location for positioning the plant lamp 30. The supporting structure 25 can be a plate structure or a column structure, etc. and the present application does not define the specific shape and structure thereof, and can play the role of mounting and supporting the plant lamp 30. In this case, the supporting structure 25 may be provided with one or two or more plant lamps 30.

With reference to FIGS. 2 to 5, in one embodiment of the present present disclosure, the supporting structure 25 comprises at least one support column 251 and at least one limiting member 253, wherein the support column 251 is connected to the telescopic member 23, and the two support columns 251 in the two supporting structures 25 are arranged in parallel and opposite to each other; the limiting member 253 protrudes from the upper surface of the support column 251, and encloses with the support column 251 to form a limiting space 258; the plant lamps 30 have a strip-shaped structure, at least two plant lamps 30 are arranged side by side along the length direction of the support column 251, and the same end of the at least two plant lamps 30 is commonly connected to the mounting seat 31, and the two mounting seats 31 are adapted to be accommodated in the limiting spaces 258 on the two supporting structures 25 and are arranged horizontally.

In the present embodiment, at least two plant lamps 30 are formed side by side to form a lamp group, and further, mounting seats 31 are provided at both ends of the lamp group so that the portion can form a more regular integral structure. However, the supporting structure 25 can better accommodate the mounting seat 31 in the lamp group by means of the limiting space 258 formed by the support column 251 and the limiting member 253, and can further limit the plant lamp 30 in the horizontal direction, so as to improve the stability of the plant lamp 30 arranged on the supporting structure 25, thereby further improving the stability of the plant lamp 30 during lifting. In addition, it should be noted that one lamp group or two or more lamp groups may be arranged in the limiting space 258. In other embodiments, the supporting structure 25 may include only the support columns 251.

Figure 4:
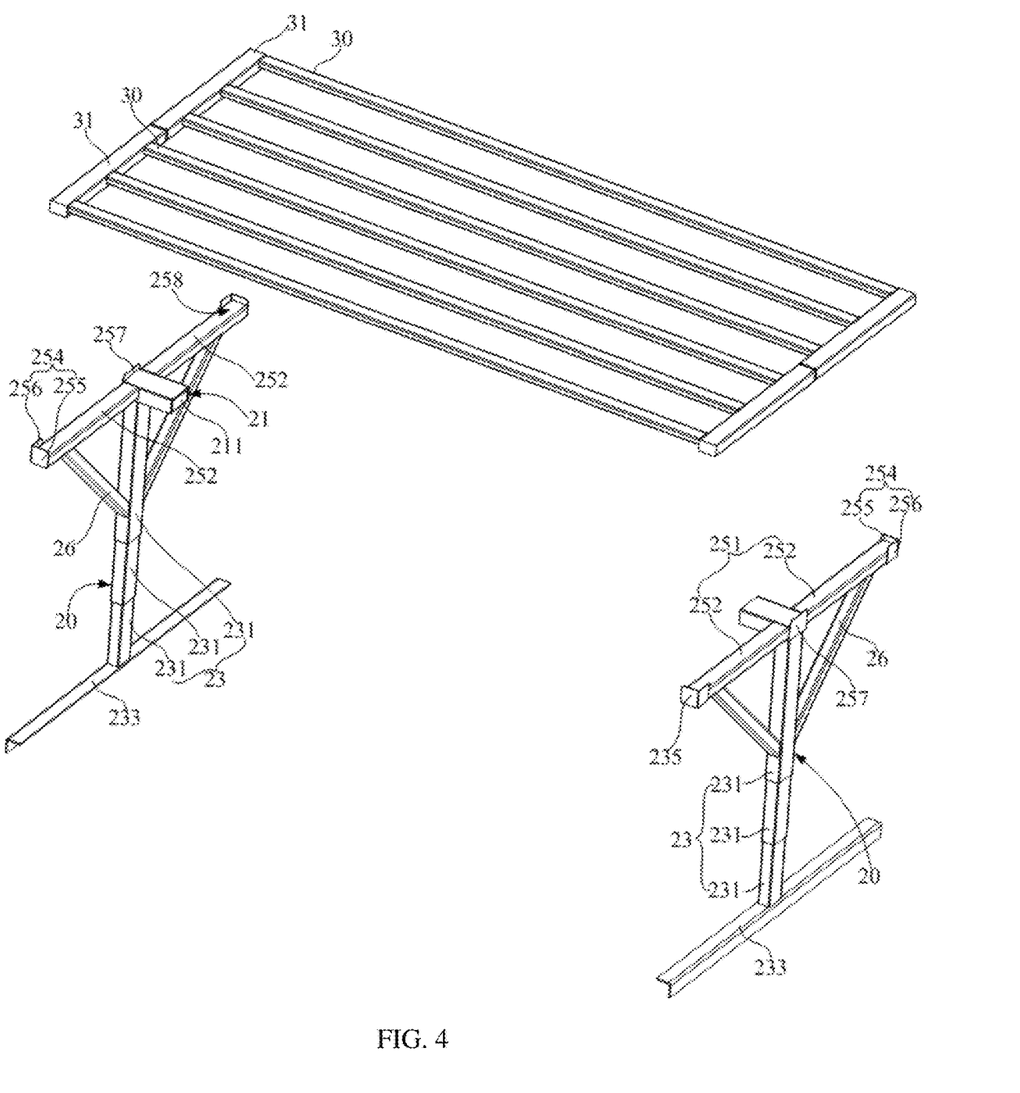
FIG. 4 is an exploded view of the lifting mechanism of FIG. 3.

With reference to FIG. 4, in one embodiment of the present present disclosure, the limiting member 253 on each support column 251 comprises at least one first limiting plate 254 arranged at two opposite ends of the support column 251, and the first limiting plate 254 comprises at least one first plate body 255 and at least one second plate body 256 arranged at an included angle in the horizontal direction; the upper surfaces of the first plate body 255, the second plate body 256 and the support column 251 enclose to form at least one limiting space 258, and at least one gap is formed between the mounting seat 31 and both the first plate body 255 and the second plate body 256.

In the present embodiment, the first limiting plate 254 can have a limiting effect on the corner of the mounting seat 31 via the first plate body 255 and the second plate body 256 which are arranged at an included angle, and further has a limiting effect on the mounting seat 31 in two directions intersecting in the horizontal direction (namely, the front-and-rear direction and the left-and-right direction described below). In addition, the mounting seat 31 is provided indirectly with both the first plate body 255 and the second plate body 256, so that the plant lamp 30 can be conveniently placed in or taken out of the limiting space 258. Wherein both the first plate body 255 and the second plate body 256 in the first limiting plate 254 may have a connection relationship to improve the overall strength of the first limiting plate 254. Of course, the first plate body 255 and the second plate body 256 in the first limiting plate 254 may be spaced apart.

With reference to FIG. 4, in one embodiment of the present present disclosure, the limiting member 253 on each support column 251 further comprises at least one second limiting plate 257, the second limiting plate 257 is arranged between two first limiting plates 254 on the support column 251, and the upper surface of the support column 251, the two first limiting plates 254 and the second limiting plate 257 enclose to form at least one limiting space 258.

In the present embodiment, the stop function can be further performed by the second limiting plate 257, thereby contributing to further improving the stability of the plant lamp 30 seated on the supporting structure 25. Wherein the number of the second limiting plates 257 can be one, but can also be at least two; in this case, at least two second limiting plates 257 are successively arranged in the length direction of the support column 251. In addition, each support column 251 may include at least two support sections 252 along its length to provide a relatively long length support column 251, which may be separately manufactured at the time of manufacture. At this time, it is also possible to connect and fix two adjacent support sections 252 by the second limiting plate 257. Further, referring to FIGS. 4 and 5 in combination, at least one connecting column 26 may be provided between the support column 251 and the upper end of the telescopic member 23, so that the parts may be combined to form a triangular structure, thereby contributing to further improving the stability of the structure of the part to improve the stability of the support for the plant lamp 30.

Figure 5:
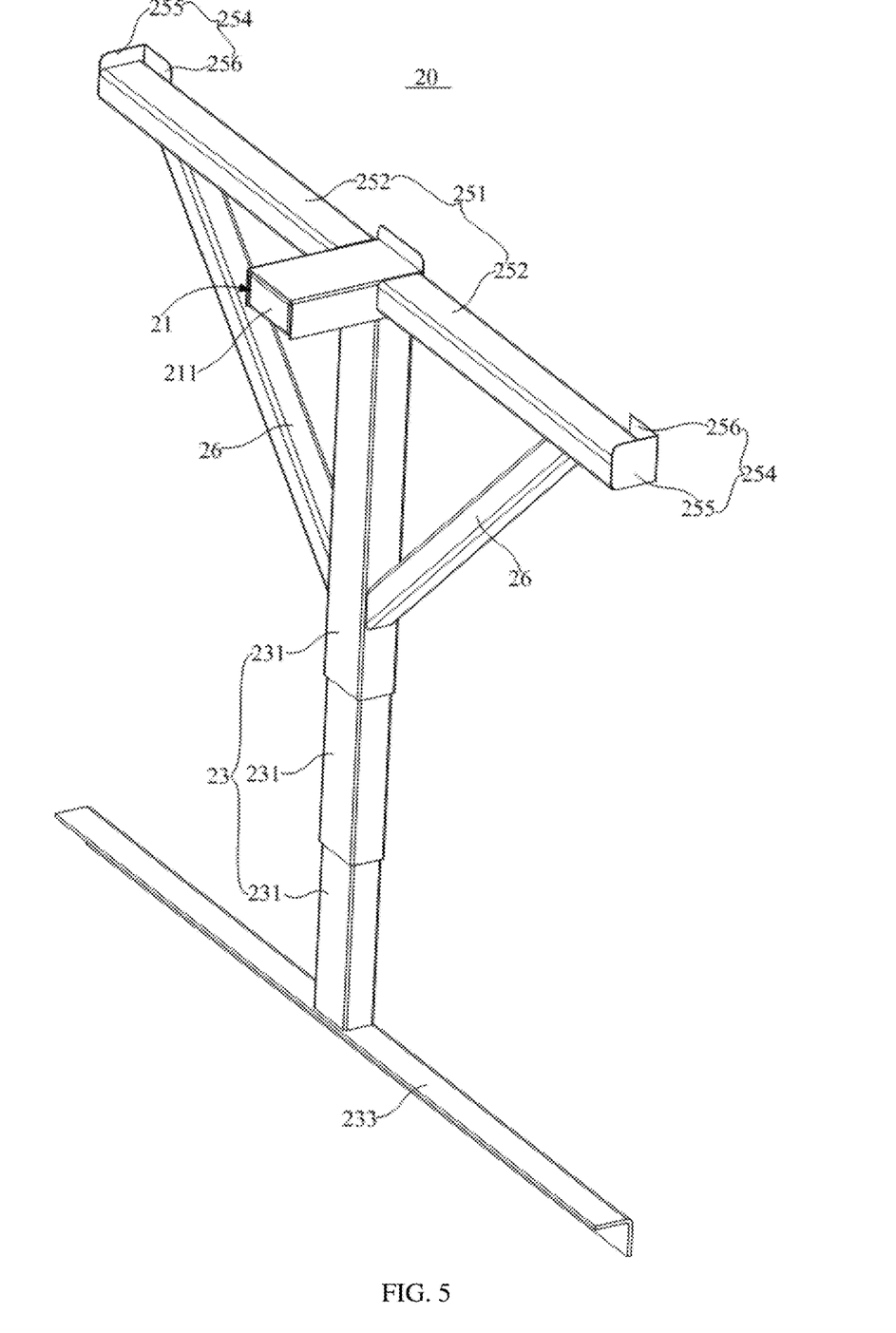
FIG. 5 is a partial schematic view of the lifting mechanism of FIG. 3.
Figure 6:
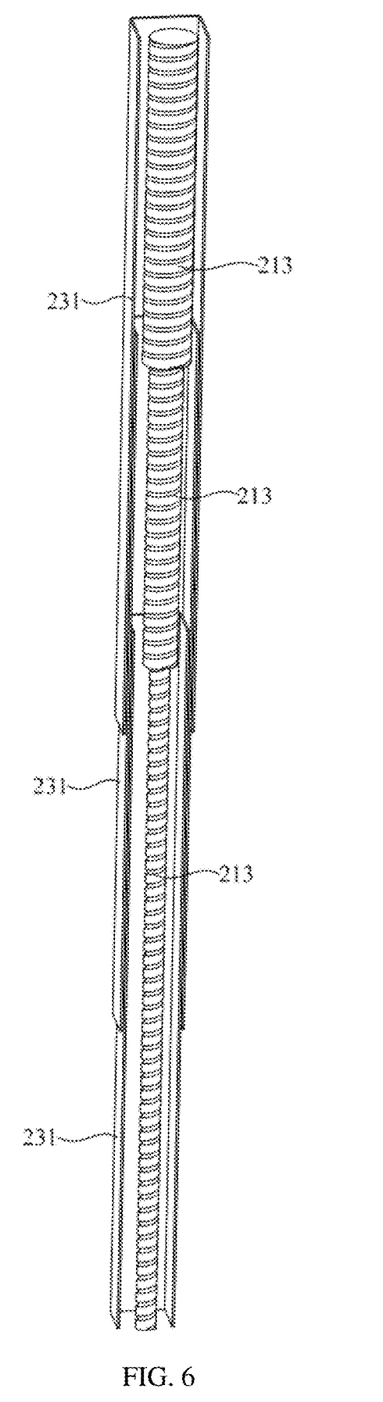
FIG. 6 is a partial cross-sectional view of the lifting mechanism of FIG. 5.
Figure 7:
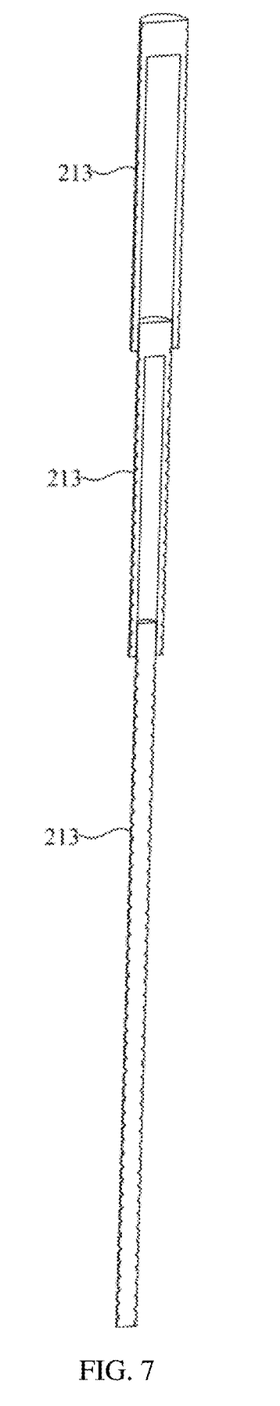
FIG. 7 is a cross-sectional view of the lead screw of FIG. 6.

With reference to FIGS. 5 to 7, in one embodiment of the present present disclosure, the telescopic member 23 comprises at least two telescopic tubes 231, and at least two sections of the telescopic tubes 231 are successively arranged in a movable manner in the up-and-down direction; the uppermost telescopic tube 231 is connected to the supporting structure 25, the lowermost telescopic tube 231 is connected to a fixing bracket 233, and the fixing bracket 233 is detachably connected to the growth rack 10; at least part of the driving member 21 is provided in the telescopic tube 231 and is connected to the uppermost telescopic tube 231, and the driving member 21 can drive the telescopic tube 231 to telescope so as to drive the supporting structure 25 to rise and fall.

In the present embodiment, the telescopic tubes 231 in the telescopic member 23 may have a square shape or a circular shape, and in this case, at least two telescopic tubes 231 are arranged in a sleeve shape, so as to reduce the overall volume of the telescopic member 23. Locating at least part of the driving member 21 within the telescopic tube 231 makes it possible to distribute both the telescopic member 23 and the driving member 21 more compact in order to further reduce the overall volume. The telescopic member 23 may then provide an attachment site for mounting the telescopic member 23 to the growth rack 10 via at least one fixing bracket 233. The fixing bracket 233 is detachably connected to the growth rack 10 to facilitate subsequent maintenance and replacement of the lifting mechanism 20. The specific connection mode of the fixing bracket 233 may be a screw connection or a snap connection.

With reference to FIGS. 5 to 7, in one embodiment of the present present disclosure, the driving member 21 comprises at least one electric motor 211 and at least two lead screws 213, wherein the electric motor 211 is connected to the uppermost telescopic tube 231 of the telescopic member 23 and is located outside the telescopic tube 231; at least two lead screws 213 are movably mounted in series in an up-and-down direction, and one of the at least two lead screws 213 is rotatably connected to the telescopic tube 231 provided close to the supporting structure 25, and the lead screw 213 at one end away from the supporting structure 25 is connected to at least one fixing bracket 233; the electric motor 211 is also drivingly connected to the lead screw 213 connected to the supporting structure 25, and the electric motor 211 drives the lead screw 213 drivingly connected thereto so that at least two lead screws 213 can extend and retract in the up-and-down direction so as to drive the two telescopic tubes 231 to extend and retract in the up-and-down direction.

In this embodiment, the driving member 21 comprises at least one electric motor 211 and at least one lead screw 213, and the lead screw 213 transmission has the advantage of being stable, so as to further improve the stability of the plant lamp 30 during lifting. Furthermore, it may be convenient to arrange the lead screw 213 in the telescopic member 23, so that an isolation protection of the lead screw 213 is achieved by means of the telescopic member 23, so that the possibility of damage to the driving member 21 is reduced and the service life of the driving member 21 is increased. Wherein the electric motor 211 can be directly connected to the lead screw 213 so as to drive the lead screw 213 to rotate, and the two lead screws 213 installed in a sleeved arrangement are in a threaded connection, thereby driving the lead screw 213 to extend or retract. Of course, the electric motor 211 may be disposed outside one of the telescopic tubes 231 in the telescopic column and connected to a lead screw 213 through bevel gear set to drive the lead screw 213. Further, the process that the lifting mechanism 20 drives the telescopic member 23 to telescope may be: when the telescopic member 23 comprises three telescopic tubes 231, the cross sections of the three telescopic tubes 231 can be successively arranged in an increasing manner in the direction from bottom to top, so that the telescopic tube 231 at the middle part can be slidably sheathed on the telescopic tube 231 at the lower end, and the telescopic tube 231 at the upper end can be slidably sheathed on the telescopic tube 231 at the middle part. Meanwhile, the lower end of the telescopic tube 231 of the lower end is connected to the fixing bracket 233, and the upper end of the telescopic tube 231 of the upper end is connected to the supporting structure 25. Accordingly, three lead screws 213 can also be provided, and the cross sections of the three lead screws 213 can be successively arranged in an increasing manner in the direction from bottom to top, so that the lead screw 213 at the middle part can be slidably sheathed on the lead screw 213 at the lower end, and the lead screw 213 at the upper end can be slidably sheathed on the lead screw 213 at the middle part. Meanwhile, the lower end of the lead screw 213 at the lower end may be connected to a shoe, and the upper end of the lead screw 213 at the upper end may be rotatably connected to a telescopic section provided adjacent to the supporting structure 25. Then, when the electric motor 211 drives the upper lead screw 213 to rotate in one direction directly or via a bevel gear set, since the middle lead screw 213 can also rotate, the middle lead screw 213 can be driven to rotate following the upper lead screw 213. At this time, the middle lead screw 213 is relatively rotated with respect to the lower lead screw 213, so that the middle lead screw 213 can be retracted downward and sleeved outside the lower lead screw 213. Thereafter, since the middle lead screw 213 cannot be further lowered and retracted with respect to the lower lead screw 213, the middle lead screw 213 cannot be further rotated. Furthermore, when the electric motor 211 continues to rotate, only the upper lead screw 213 is driven to rotate. At this time, the relative rotation of the upper end lead screw 213 with respect to the middle lead screw 213 is realized, so that the upper end lead screw 213 can be retracted downward and sleeved outside the middle lead screw 213, thereby completing the retraction process of the telescopic member 23. On the contrary, when the electric motor 211 directly or through the bevel gear set drives the upper lead screw 213 to rotate in the other direction, the middle lead screw 213 can be firstly driven to rotate relative to the lower lead screw 213 to achieve the first upward extension of the middle lead screw 213. After the middle lead screw 213 is extended to a position, the upper lead screw 213 can be driven to rotate relative to the middle lead screw 213 to achieve the upward extension of the upper lead screw 213, thereby completing the extension process of the telescopic member 23.

Figure 1:
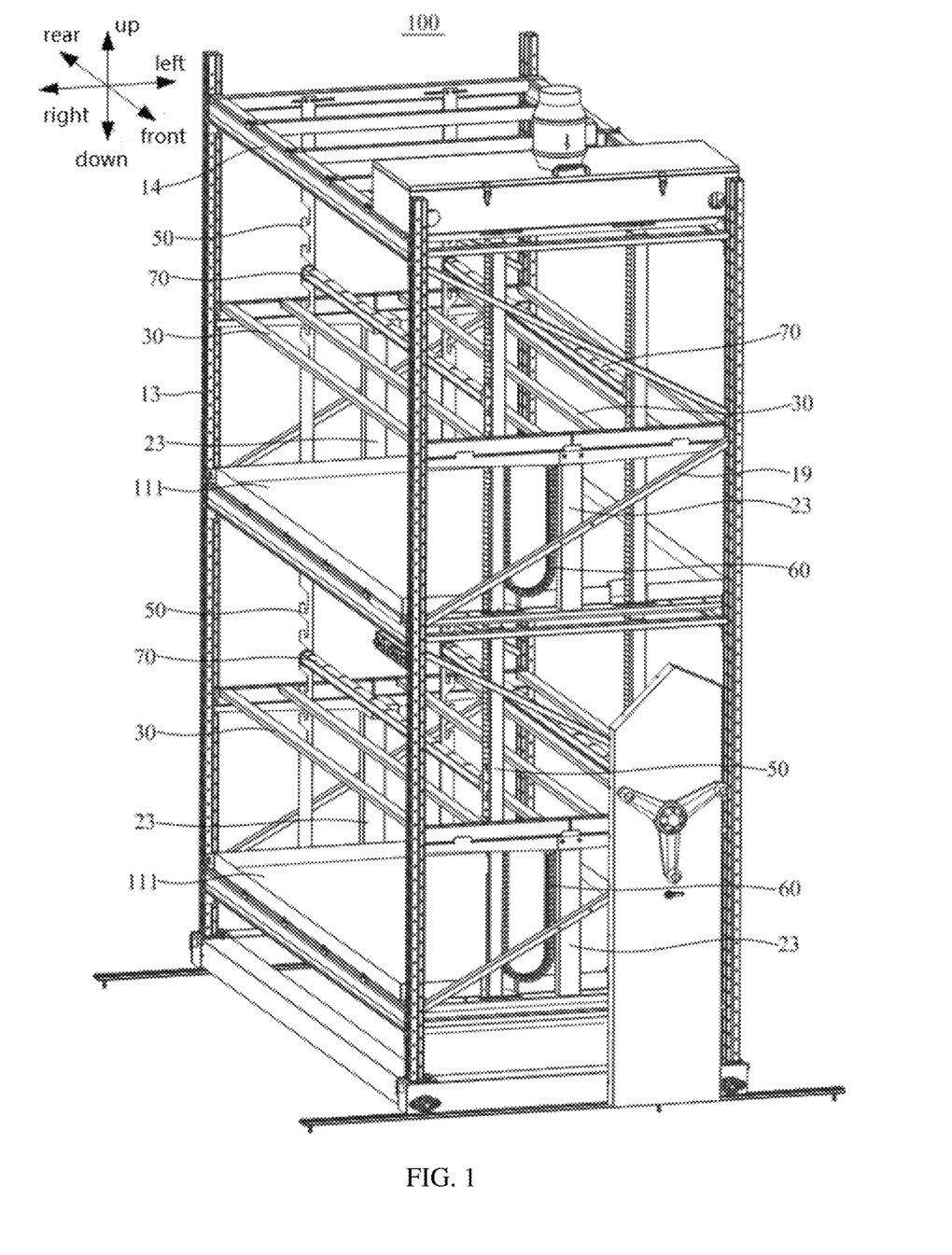
FIG. 1 is a schematic view showing the configuration of an embodiment of the present utility plant lighting system.
Figure 2:
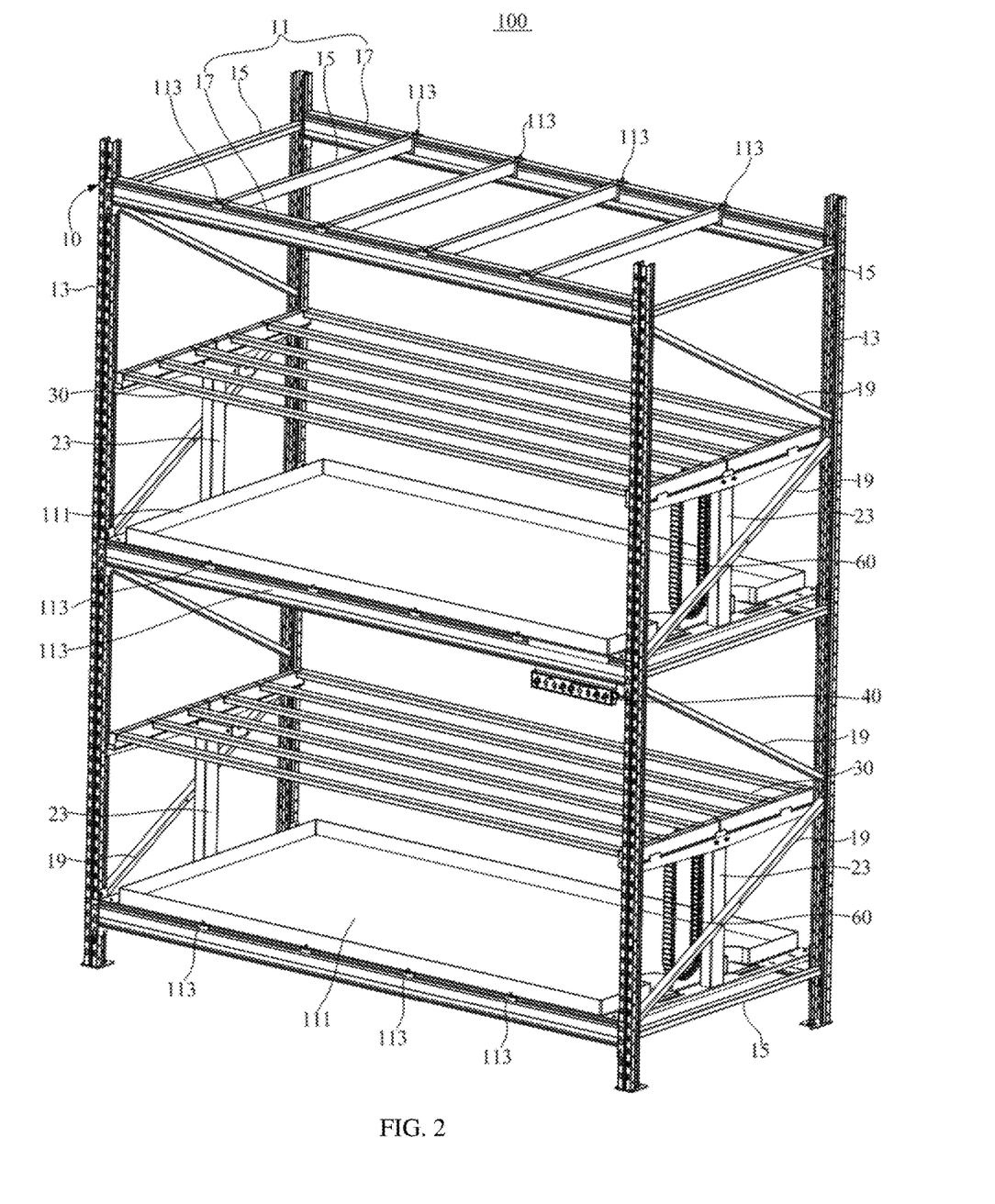
FIG. 2 is a schematic view of the growth rack of the plant lighting system of FIG. 1.
Figure 3:
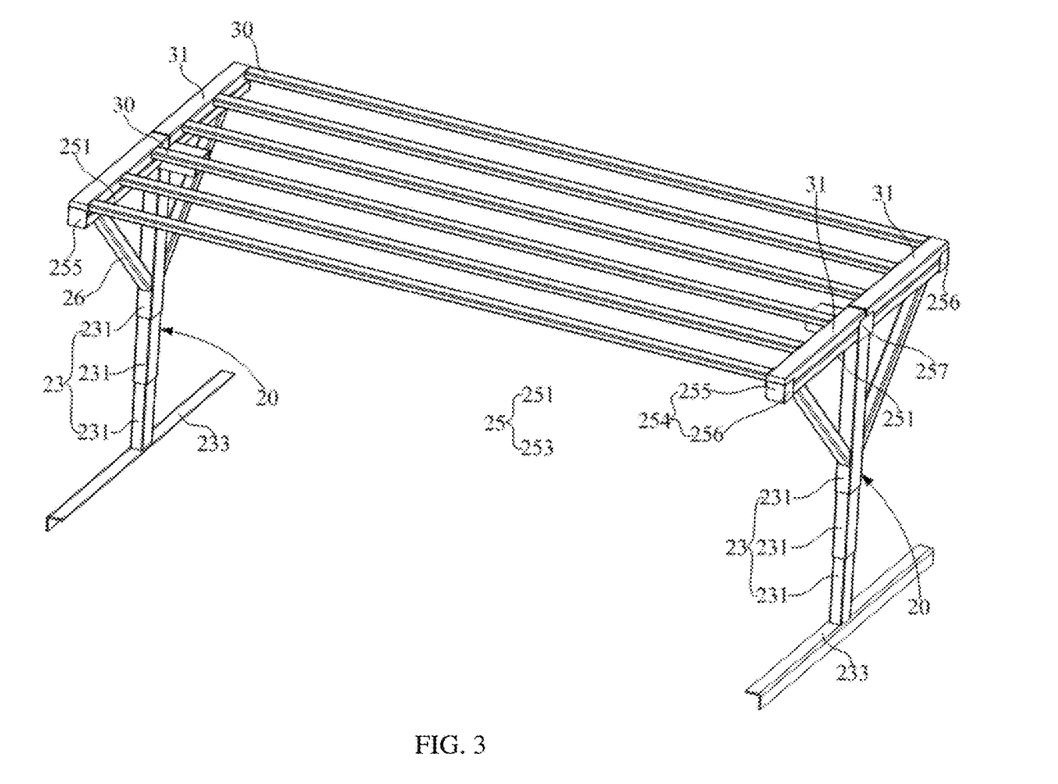
FIG. 3 is a schematic view showing the structure of the lifting mechanism in the plant lighting system of FIG. 1.

With reference to FIGS. 1 and 2, in one embodiment of the present present disclosure, it is defined that the height direction of the growth rack 10 is an up-and-down direction, the length direction is a front-and-rear direction, and the width direction is a left-and-right direction; the growth rack 10 comprises four vertical columns 13, a plurality of transverse columns 15, a plurality of longitudinal columns 17 and a plurality of reinforcing columns 19, wherein the vertical columns 13 extend in the up-and-down direction, the transverse columns 15 extend in the left-and-right direction, and the longitudinal columns 17 extend in the front-and-rear direction, the plurality of transverse columns 15 and the plurality of longitudinal columns 17 located at the same height constitute one rack layer 11, each two lifting mechanisms 20 are located at the front and rear sides of one rack layer 11 and are fixed on the longitudinal columns 17 in the corresponding rack layer 11, and the reinforcing columns 19 are located between each adjacent two rack layers 11; in addition, two ends of the reinforcing column 19 are respectively connected to two vertical columns 13 successively distributed in the left-and-right direction, the reinforcing column 19 is arranged close to the telescopic member 23 in the horizontal direction, and the lifting mechanism 20 and the plant lamp 30 are arranged at intervals from the vertical columns 13.

In the present embodiment, the growth rack 10 is provided to include four vertical columns 13, a plurality of transverse columns 15, and a plurality of longitudinal columns 17, so that the growth rack 10 is formed by enclosing a plurality of columns, and the raw materials required for manufacturing the growth rack 10 can be reduced, thereby contributing to a reduction in manufacturing costs. At the same time, such an arrangement also facilitates the passage of air currents inside and outside the growth rack 10 in order to increase the mobility of the air currents to facilitate the growth of plants located inside the growth rack 10. Still further, the provision of the reinforcing columns 19 may increase the overall strength of the growth rack 10 to improve service life. In addition, the reinforcing column 19 is arranged adjacent to the telescopic member 23, so that the structural stability of the telescopic member 23 can be improved, and the lifting mechanism 20 is arranged at a spacing from the vertical column 13, so that smooth and stable lifting can be maintained. In addition, since the lifting mechanism 20 is provided at both ends of the plant lamp 30, the plant lamp 30 can be smoothly elevated and lowered in the elevated state, so that it is not necessary to extend the end of the plant lamp 30 into the vertical column 13 to control the stability in the horizontal direction.

With reference to FIG. 2, in one embodiment of the present present disclosure, each rack layer 11 is provided with at least one upwardly extending abutment plate 113 on the left and right sides, and the abutment plate 113 can abut against the side wall surface of the tray 111, so that the tray 111 is limitedly mounted on the rack layer 11.

In the present embodiment, the tray 111 is limited in abutment by the abutment plate 113, so that there may be no connection relationship between the tray 111 and the growth rack 10, thereby facilitating the installation and removal of the tray 111 on the shelf.

With reference to FIGS. 1 and 2 in combination, in one embodiment of the present present disclosure, the plant lighting system 100 further comprises at least one electric control assembly 40, wherein the electric control assembly 40 is provided on a longitudinal column 17 located on the left side of the growth rack 10 and is electrically connected to the lifting mechanism 20 and the plant lamp 30, so as to control the driving member 21 in the lifting mechanism 20 to drive the telescopic member 23 and to control the brightness of the plant lamp 30.

In the present embodiment, the operation of the driving member 21 and the plant lamp 30 in the lifting mechanism 20 can be controlled by the electric control assembly 40 to improve the convenience of use of the plant lighting system 100. Among other things, the electric control assembly 40 may include a housing, at least one circuit board disposed within the housing, and keys disposed on the surface of the housing.

With reference to FIGS. 1 and 2 in combination, in one embodiment of the present present disclosure, the plant lighting system 100 further comprises at least two mounting rods 50 and at least one drag chain 60, wherein the mounting rods 50 are connected to the growth rack 10, and the mounting rods 50 extend in the up-and-down direction and are arranged adjacent to a lifting mechanism 20; the drag chain 60 is U-shaped in projection perpendicular to the front-and-rear direction, and both ends of the drag chain 60 are respectively connected to the mounting rod 50 and the driving member 21, and a cable for connecting the driving member 21 passes through the drag chain 60.

In the present embodiment, the cable of the electric motor motor 211 can be given an accommodation space by the drag chain 60, so as to facilitate the regularity of the arrangement of the cable of the electric motor 211, and at the same time can have a protective effect on the cable. The mounting rod 50 may be directly fixed to the growth rack 10, or may be indirectly fixed to the growth rack 10 by being fixed to the fixing bracket 233.

With reference to FIG. 1, in an embodiment of the present present disclosure, a plant lighting system 100 further comprises at least one light supplement lamp 70, wherein the light supplement lamp 70 is arranged to extend in the front-and-rear direction, two opposite ends of the light supplement lamp 70 are movably mounted on two mounting rods 50 respectively, and the light emitting direction of the light supplement lamp 70 is arranged horizontally.

In this embodiment, the mounting position can also be given by the mounting rod 50, i.e. the mounting rod 50 can be provided with at least one recess for mounting the light supplement lamp 70. In this manner, light can be emitted downward by the plant lamp 30, which is the primary light source for plant growth, providing most of the light energy for plant growth. And the light can be emitted in the horizontal direction by the light supplement lamp 70, the power of the light supplement lamp 70 is less than that of the plant lamp 30, and the light supplement lamp 70 is used as an auxiliary light source, and when the light emitted downwards by the plant lamp 30 is blocked (such as being blocked by the stem, leaf or other things of a plant), the light supplement lamp 70 can further supplement light, so that more plant leaves can sufficiently obtain illumination. Therefore, by using the combination of the plant lamp 30 and the light supplement lamp 70, more uniform and abundant light environment can be obtained when the plant is densely planted or the plant height is high. Here, only the plant lamp 30 may be used when the plant height of the plant is low. When the plant height is high and the leaves are dense so that the plant lamp 30 is difficult to irradiate the lower leaves of the plant, the light supplement lamp 70 may be turned on as the auxiliary light source, and at this time, the light supplement lamp 70 may be installed at lower height than the plant lamp 30 and irradiate the lower leaves of the plant. In addition, the light supplement lamp 70 can also be a LED lamp or an incandescent lamp, and this is not specifically limited in the present application. Further, the number of light supplement lamps 70 in each rack layer 11 may be two, and the two light supplement lamps 70 may be arranged at intervals in the left-and-right direction, and the light emitting directions of the two light supplement lamps 70 may be arranged opposite to each other so that the left and right sides are illuminated. In addition, on the horizontal projection surface, the light supplement lamp 70 may be positioned between two adjacent plant lamps 30 so that the light supplement lamp 70 does not affect the plant lamps 30 as they ascend and descend.

The above-mentioned description is merely a preferred embodiment of the present present disclosure, and does not limit the scope of the patent of the present present disclosure. Any equivalent structural transformation made by using the contents of the description and the drawings of the present present disclosure under the inventive concept of the present present disclosure, or direct/indirect application in other relevant technical fields, is included in the scope of the patent protection of the present present disclosure.

What is claimed is:

1. A plant lighting system comprising:
   at least one growth rack, wherein the growth rack comprises rack layers in an up-and-down direction, and each of the rack layers is provided with at least one tray;
   lifting mechanisms, wherein the lifting mechanisms are provided in each of the rack layers, and each two of the lifting mechanisms are oppositely arranged at two sides of each one of the trays; each lifting mechanism comprises at least one driving member, at least one telescopic member and at least one supporting structure, wherein the telescopic member extends in an up-and-down direction, the supporting structure is provided at an upper end of the telescopic member and is arranged substantially perpendicular to the telescopic member, and the driving member is configured to drive the telescopic member to telescope in the up-and-down direction; and
   at least one plant lamp, opposite ends of the plant lamp being movably arranged above two of the supporting structures, and the plant lamp is mounted such that light emitted from the plant lamp is illuminated towards the tray.

2. The plant lighting system as claimed in claim 1, wherein each supporting structure comprises at least one support column and at least one limiting member, the support column is connected to the telescopic member, and two of the support columns in two of the supporting structures are oppositely arranged in parallel; the limiting member is convexly arranged on the upper surface of the support column, and surrounds the support column to form at least one limiting space; and
   the plant lamps have a strip-shaped structure, at least two of the plant lamps are arranged side by side along the length direction of the support column, and the same end of the at least two plant lamps is commonly connected to one mounting seat, and two of the mounting seats are adapted to be accommodated in the limiting spaces on two of the supporting structures and are arranged horizontally.

3. The plant lighting system as claimed in claim 2, wherein the limiting member on each of the support columns comprises at least one first limiting plate disposed at opposite ends of the support column, the first limiting plate comprising at least one first plate body and at least one second plate body disposed at an included angle in a horizontal direction; and
   the upper surfaces of the first plate body, the second plate body and the support column enclose to form the limiting space, and at least one gap is formed between the mounting seat and both the first plate body and the second plate body.

4. The plant lighting system as claimed in claim 1, wherein each telescopic member comprises at least two telescopic tubes, and at least two sections of the telescopic tubes are sequentially mounted in a nested arrangement movable in up-and-down directions; the uppermost telescopic tube is connected to the supporting structure, the lowermost telescopic tube is connected to at least one fixing bracket, and the fixing bracket is detachably connected to the growth rack; and
   at least part of the driving member is arranged in the telescopic tube, and is connected to the uppermost telescopic tube, and the driving member can drive the telescopic tube to telescope so as to drive the supporting structure to lift and fall.

5. The plant lighting system as claimed in claim 4, wherein the driving members each comprises: at least one electric motor, wherein the electric motor is connected to the telescopic tube located at the uppermost position in the telescopic member and is located outside the telescopic tube; and lead screws, wherein at least two of the lead screws are movably mounted in nested arrangement in an up-and-down direction, and one of the at least two lead screws is rotatably connected to the telescopic tube arranged close to the supporting structure, and the lead screw at one end away from the supporting structure is connected to the fixing bracket; and the electric motor is also in transmission connection with the lead screw connected to the supporting structure, and the electric motor drives the lead screw in transmission connection therewith, and can make the at least two lead screws extend and retract in the up-and-down direction, so as to drive telescopic tubes to extend and retract in the up-and-down direction.

6. The plant lighting system as claimed in claim 1, wherein a height direction of the growth rack is defined as an up-and-down direction, a length direction as a front-and-rear direction, and a width direction as a left-and-right direction; and each growth rack comprises four vertical columns, a plurality of transverse columns, a plurality of longitudinal columns and a plurality of reinforcing columns, wherein the vertical columns extend in the up-and-down direction, the transverse columns extend in the left-and-right direction, and the longitudinal columns extend in the front-and-rear direction, a plurality of the transverse columns and a plurality of the longitudinal columns located at the same height constitute one rack layer, each two lifting mechanisms are located at the front and rear two sides of one rack layer and are fixed on the longitudinal columns in the corresponding rack layer, and the reinforcing columns are located between each adjacent two rack layers; and two ends of each reinforcing column are respectively connected to two of the vertical columns distributed successively in the left-and-right direction, the reinforcing column is arranged close adjacent to the telescopic member in the horizontal direction, and the lifting mechanisms and the plant lamps are arranged at intervals with the vertical columns.

7. The plant lighting system as claimed in claim 6, wherein each rack layer is provided with upwardly extending abutment plates on both left and right sides, the abutment plates being adapted to abut side wall surfaces of the tray such that the tray rests on the rack layer.

8. The plant lighting system as claimed in claim 6, wherein the plant lighting system further comprising at least one electric control assembly disposed on one of the longitudinal columns on the left side of the growth rack and electrically connected to the lifting mechanism and the plant lamp to control the driving member in the lifting mechanism to drive the telescopic member and to control the brightness of the plant lamp.

9. The plant lighting system as claimed in claim 6, wherein the plant lighting system further comprising at least two mounting rods and at least one drag chain, the mounting rods being connected to the growth rack, the mounting rods extending in an up-and-down direction and being disposed adjacent to one of the lifting mechanisms; the drag chain is U-shaped in a projection perpendicular to the front-and-rear direction, two ends of the drag chain are respectively connected to the mounting rod and the driving member, and at least one cable for connecting the driving member passes through the drag chain.

10. The plant lighting system as claimed in claim 9, wherein the plant lighting system further comprising at least one light supplement lamp, wherein the light supplement lamp is arranged to extend in the front-and-rear direction, opposite ends of the light supplement lamp are movably mounted on the two mounting rods, respectively, and the light emitting direction of the light supplement lamp is arranged horizontally.

\* \* \* \* \*